# United States Patent [19]

Gerling

[11] 3,772,491

[45] Nov. 13, 1973

[54] METAL ROLLER CONVEYOR FOR MICROWAVE OVENS
[75] Inventor: John E. Gerling, Palo Alto, Calif.
[73] Assignee: Gerling Moore Inc., Palo Alto, Calif.
[22] Filed: Mar. 10, 1972
[21] Appl. No.: 233,537

[52] U.S. Cl. ............................................. 219/10.55
[51] Int. Cl. ............................................... H05b 9/06
[58] Field of Search ................................. 219/10.55

[56] References Cited
UNITED STATES PATENTS
3,476,904   11/1969   Schroeder......................... 219/10.55
2,583,338   1/1952   Morse et al....................... 219/10.55
3,508,023   4/1970   Veda et al. ...................... 219/10.55

Primary Examiner—J. V. Truhe
Assistant Examiner—Hugh D. Jaeger
Attorney—Paul D. Flehr et al.

[57] ABSTRACT

A roller type conveyor for microwave ovens in which the rollers are individually driven by suitable drive external to the oven. Each roller is supported on a strong metal shaft and is itself made of conductive metal. A microwave short is provided to prevent leakage in the region of the passageway in the oven wall through which the shaft extends. A dual speed embodiment of the invention is also disclosed as well as a complete system for the treatment of extruded foam polymers.

12 Claims, 6 Drawing Figures

METAL ROLLER CONVEYOR FOR MICROWAVE OVENS

BACKGROUND OF THE INVENTION

This invention relates to conveyors for microwave ovens and more particularly to a beltless conveyor using metal driven rollers.

Heretofore, microwave ovens have commonly been provided with belts or rollers for continuously transporting materials through the oven. Where belts or rollers are made of dielectric materials they become contaminated by the material being processed, as by sticking to the dielectric material or flaking off on it. Such spots of contamination become excessively heated and cause hot spots and uneven heat distribution in the product being processed. Such dielectric materials are also insufficiently resistant to chemical attack and lack sufficient strength at high temperatures. Furthermore, the use of a belt conveyor causes nonuniform heating at the location of support for the belt. Also, belt conveyors are unable to accommodate significant changes in dimension of certain materials during transition through the oven. An example is that of foamed elastomers where the raw extrudate is cured in the oven and expands in all directions. Vertical drop systems have been used in order to eliminate the need for a supporting conveyor system, but such vertical systems have not been satisfactory due to the stretch of the material being processed under gravity and limitations on the vertical length of the treatment area. In addition, vertical systems are not useful where the material being treated is in the form of discreet segments as, for example, where the material is supplied in lengths as in the treatment of wood products. There is, therefore, a need for a new and improved conveyor system for use in microwave ovens.

It is an object of the present invention to provide am improved conveyor for use in microwave ovens which will overcome the above limitations and disadvantages.

A further object of the invention is to provide a conveyor of the above character utilizing metal rollers adequately supported on strong metal shafts externally driven from the oven, suitable means being provided for minimizing leakage of microwave energy from the oven.

Another object of the invention is to provide a conveyor of the above character in which the metal rollers are spaced apart at sufficient distance that the product being treated is free of the influence of dielectric or conductive materials causing perturbations of the effective microwave field throughout the material.

Another object of the invention is to provide a conveyor of the above character which can accommodate physical change in the dimensions of a product as in the curing of foamed rubber tubing.

Another object of the invention is to provide a conveyor of the above character in which the conveyor system is durable, has high weight support capacity at high temperatures and which is not subject to the formation of hot spots from processed material flaking or rubbing onto the conveyor parts.

Another object of the invention is to provide a conveyor system of the above character which eliminates the need for replacement of belts and rollers, the durability of the elements of the system being such that replacement is hardly if ever necessary.

The foregoing objects have been achieved by providing a conveyor system utilizing a plurality of metal rollers supported on metal shafts journalled in a suitable manner within a microwave oven to form a linear conveyor array. Means are provided for forming plurality of spaced passages through one wall of the oven for permitting the ends of the shafts to extend through that wall. Gear means are affixed to the end of each shaft exteriorly of the oven and are connected through suitable pulleys and chain means to a source of rotary motion by which each of the rollers is driven at a desired speed. Means are provided for forming a microwave capacitive shunt between the shaft and the adjacent wall in the region of the passageway through which the shaft extends so as to minimize leakage of microwave energy from the oven.

In one embodiment of the invention particularly useful in the treatment of material which expands during treatment, one form of the invention is utilized as a preheater and a second form of the invention is utilized as a treatment oven. The preheater is arranged to sense the temperature of the material, as for example being delivered from an extrusion device to the treatment oven, the amount of applied microwave energy being controlled by a suitable pyrometer so that the material supplied to the treatment oven is maintained at a constant temperature regardless of the energy content of the material as it is extruded. Once passed into the microwave oven suitable means are provided for sensing the position of the point of curing and expansion of the material and for controlling the amount of applied microwave power to maintain the point of expansion in a predetermined location. A first set of driven rollers is provided before the point of expansion and are ganged together for movement at a predetermined speed. A second set of driven rollers is provided after the point of expansion of the material and are likewise ganged together and driven at a higher speed to accommodate the increase in length of the material as it is cured at the point of expansion.

These and other features and objects of the invention will become apparent from the following description and claims when taken in conjunction with the accompanying drawings.

DESCRIPTION OF THE DRAWINGS

FIG. 5 is a cross sectional view taken along the lines 5—5 of FIG. 1.

DETAILED DESCRIPTION OF THE PREFERRED EMBODIMENTS

Figure 1:
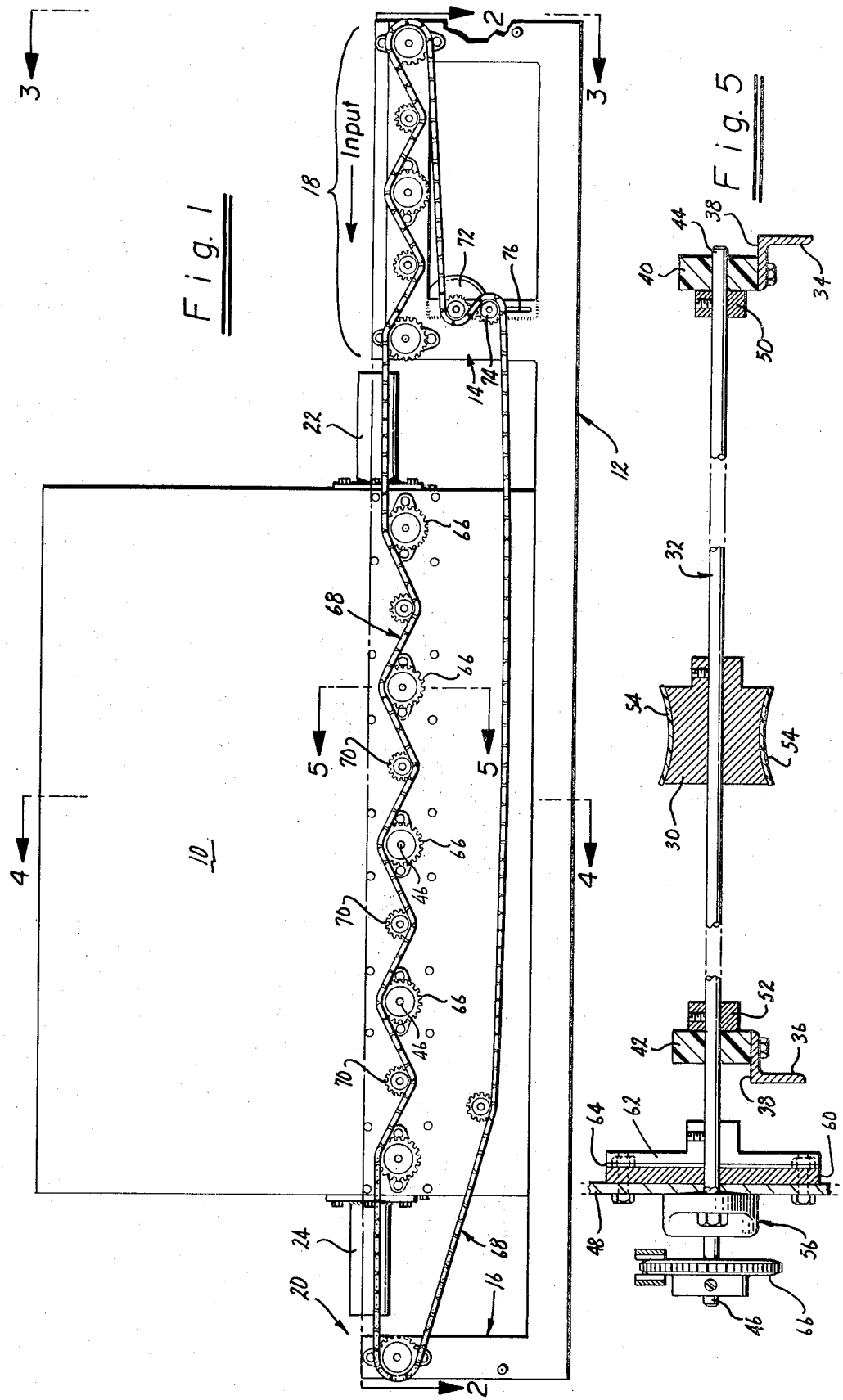
FIG. 1 is a side elevational view of the microwave oven constructed in accordance with the present invention and utilizing metallic driven rollers in accordance therewith.

Referring now to FIGS. 1 through 5, there is shown a microwave oven and metal driven roller conveyor constructed in accordance with the present invention and generally consists of a suitable microwave oven indicated at 10. The microwave oven is mounted on a suitable framework 12 which is provided with raised subframes 14, 16 at each end for mounting input and exit roller systems 18, 20.

Microwave oven 10 is of any suitable type and includes conductive walls on all sides for confining microwave energy therein. Input and outlet access openings are provided at each end of the oven and consist, for example, of circular wave guide sections 22, 24 dimensioned to be operated beyond cutoff so as to attenuate and minimize any leakage of microwave energy therefrom. Suitable power supplies not shown, mode stirrers and other auxiliary equipment, which are conventional in the microwave oven art, have been omitted from the drawings for the sake of clarity.

Figure 2:
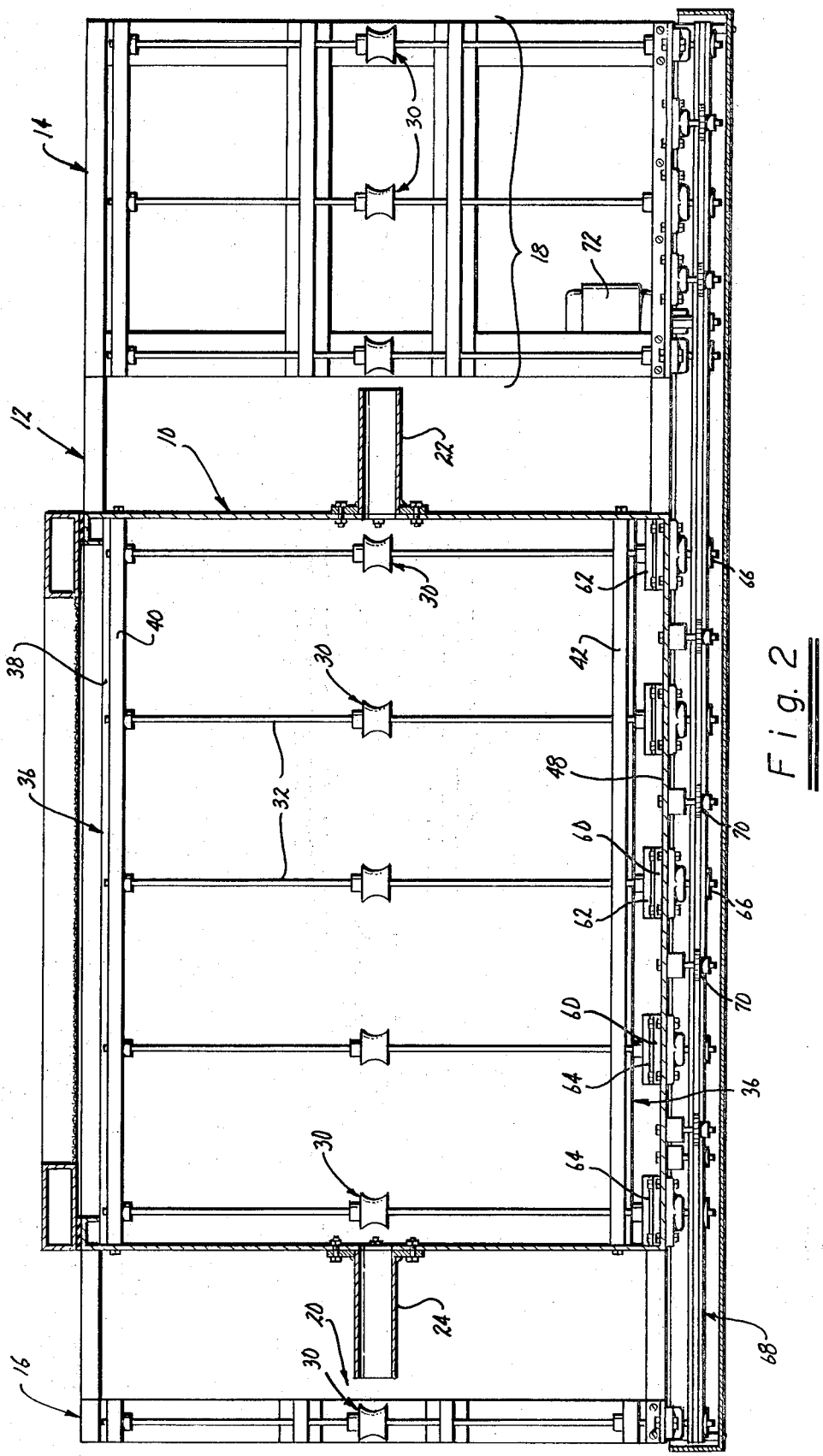
FIG. 2 is a cross sectional plan view taken along the lines 2—2 of FIG. 1.
Figure 3:
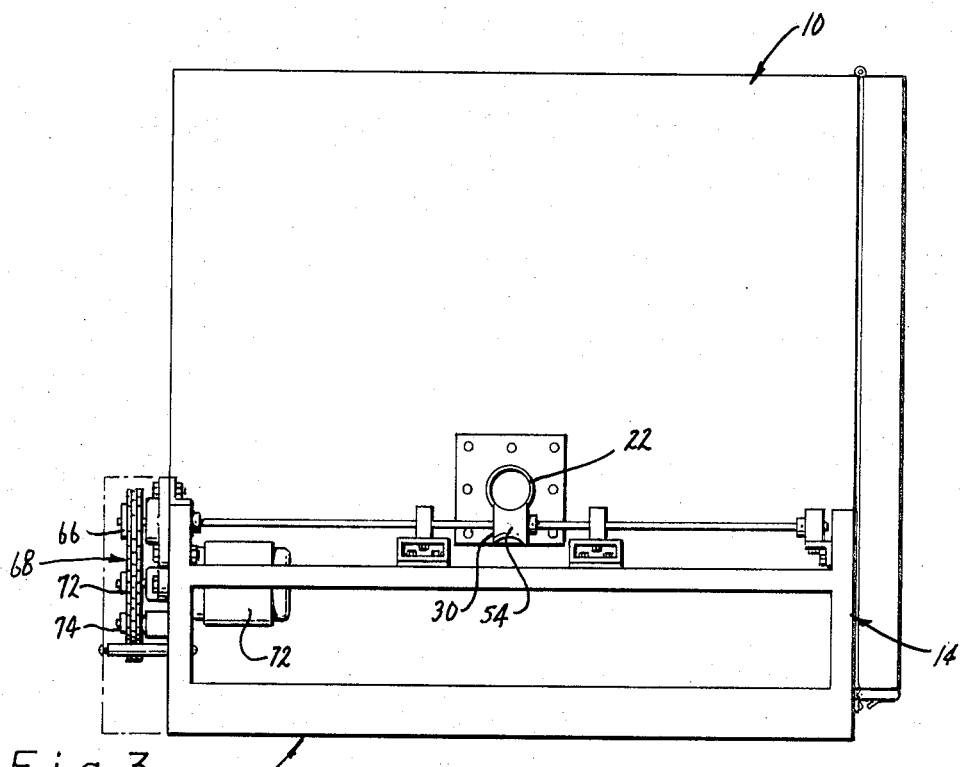
FIG. 3 is an end view taken along lines 3—3 of FIG. 1.
Figure 4:
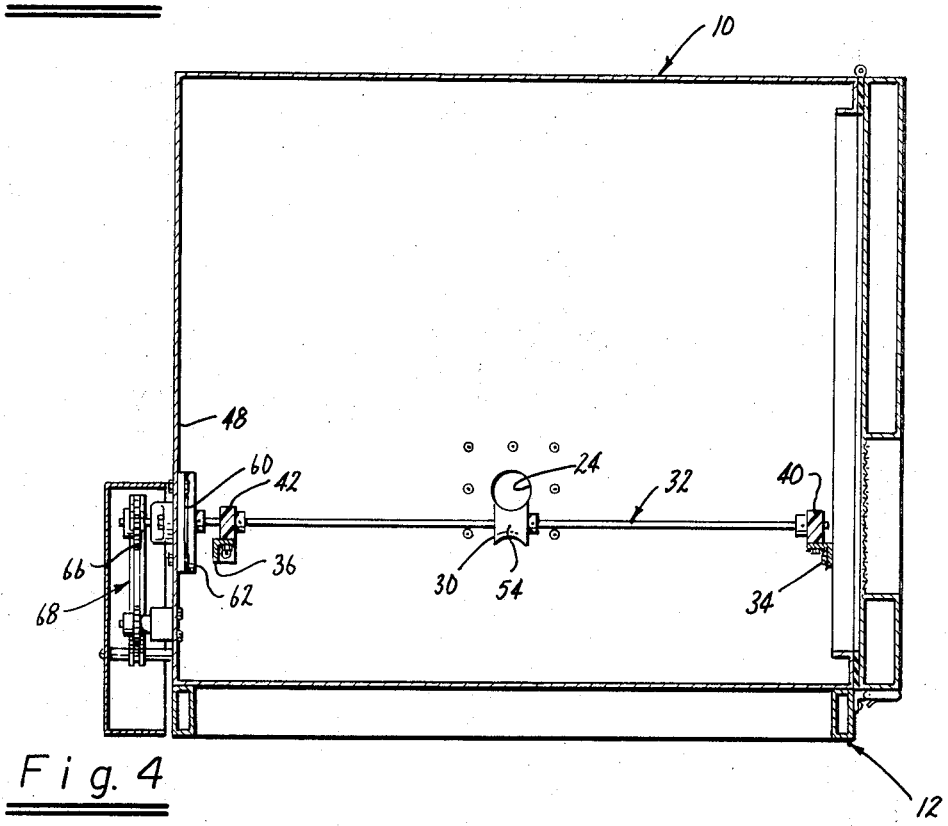
FIG. 4 is a cross sectional view taken along the lines of 4—4 of FIG. 1.

Means are provided for supporting and moving material through the oven and includes a plurality of driven metal rollers 30a mounted on metal shafts 32a in a linear array as shown in FIG. 2. Referring now to FIG. 5, where one of the driven roller assemblies is shown in detail and includes rails 34, 36 mounted along the operative length of the oven and supported by the end walls thereof, the rails are L-shaped in section so as to provide a rigid mounting surface having a horizontal upper side 38. Teflon bearing blocks 40, 42 in the form of elongate members are mounted to the upper sides 38 of the respective support rails and are provided with spaced apart and aligned passages. One end 44 of each shaft is wholly contained within the oven and terminates in block 40. The other end 46 extends through an opening in the rear wall of the oven, an intermediate portion being supported in block 42 interiorly of and adjacent to the rear wall 48. Suitable spacers 50, 52 are mounted on the shafts and secured thereto with set screws for establishing the position of the shaft relative to the oven.

Driven metal roller 30 is affixed to each shaft with a set screw at approximately its midpoint for rotation therewith. The roller may be provided with an exterior antistick coating 54 such as Teflon.

A suitable ball bearing assembly 56 is mounted to the oven wall 48 exteriorly thereof for absorbing thrust and radial load applied to the shaft 32 by means to be hereinafter described.

Since the shaft extends through an opening formed in the oven wall, it presents a potential hazard as it could serve as a coaxial transmission line for permitting leakage of microwave energy from the oven. Means is provided for forming a microwave capacitive shunt connected to the shaft and to the adjacent wall interiorly of said oven to minimize microwave leakage of energy from the oven. Such means comprises a first disc shaped member or projection 60 made of conductive metal and fastened to the interior wall of the oven. A second conductive member 62 is formed in the shape of a disc and attached for rotation with the shaft by a set screw. Together the disc projection 60 on the wall and the disc member 62 attached to the shaft are arranged to form a closely spaced gap 64 and thereby provide sufficient capacitive coupling from the shaft to the wall to serve as a shunt for microwave energy. Preferably a Teflon shim is interposed between the members 60 and 62 to prevent contact therebetween and to assure a close coupled relation without friction or shorting. The shim may be made of any suitable antifriction dielectric material, a disc of Teflon 1 mil thick having been found suitable.

Referring generally to FIGS. 1 through 5, there is shown a system for ganging the respective ones of the shafts together and for driving them at uniform speed, which consists of a plurality of sprockets 66 attached to the respective ends of each of the shafts 32 and driven by suitable link chain drive 68. The chain drive passes over each of the sprockets 66 and under interposed idler sprockets 70 mounted exteriorly of the oven on the rear wall thereof. The chain drive is driven by a suitable motor 72 and tensioned by adjustment of an idler sprocket 74 adjustably mounted in a slot 76 provided in the input conveyor framework.

Input and output conveyors 18 and 20 are provided with a plurality of metal driven rollers and shafts of similar construction to those described above in connection with the interior of the oven, except that the need for means for providing electrical shunt in the form of discs is unnecessary and has been eliminated.

In operation the conveyor of the embodiment shown in FIGS. 1 through 5 is extremely effective. As the material is conveyed through the oven, the microwave fields of the oven are substantially unperturbed in the regions between the rollers so that the field is effective in uniformly heating the material; whereas, belt conveyors perturb the fields at the point of support and thereby produce uneven heating during the entire passage of the material through the oven. However, at the rollers' surface the electric field virtually vanishes due to the requirement that the electric field component of an electromagnetic field vanishes at the surface of a conductor. Thus, adjacent these points of support the microwave heating effect is momentarily diminished. Accordingly, any material flaking or sticking to the roller is not excessively heated and the hot spots of prior devices are eliminated. Furthermore, the leakage of microwave energy is substantially avoided by the use of the microwave shunts employed upon the shafts. By using metal shafts and metal rollers the physical strength, resistance to chemical attack, and durability of the all metal system is improved to a point where conveyor replacement costs are substantially reduced.

Figure 6:
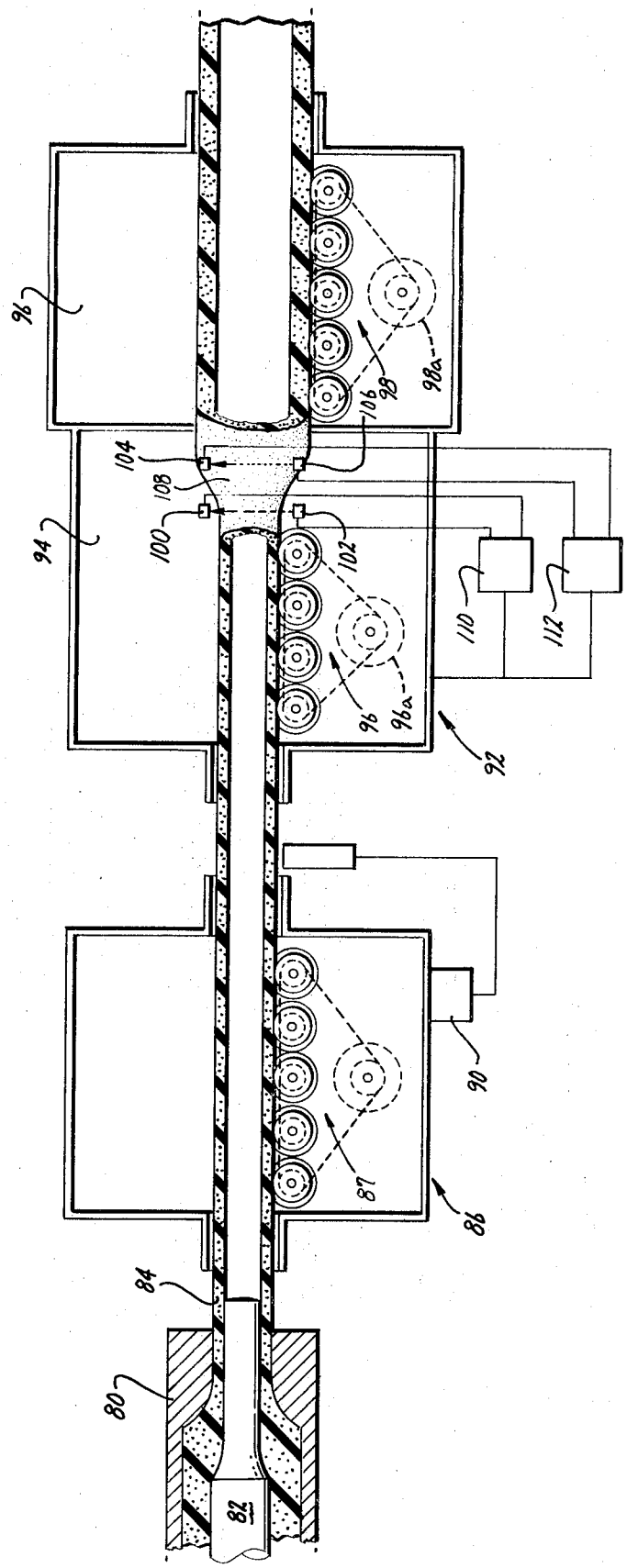
FIG. 6 is a top plan view shown schematically of a tubing curing system utilizing microwave ovens having driven roller metal conveyor systems constructed in accordance with the present invention.

Referring now to FIG. 6, there is shown schematically a tubing curing system utilizing microwave ovens having driven metal conveyors constructed in accordance with the present invention and adapted to a particular application of treatment and curing of expanded foam rubber tubing. Thus, as shown there is provided a suitable extrusion apparatus 80 having a torpedo 82 disposed at the opening thereof capable of forming a tubular shape, as for example of foamed rubber material 84 which is to be subsequently cured and expanded into a final tubular configuration. The material discharged from the extruder generally has a variable heat content, the temperature thereof being a function of its stiffness and the amount of energy required to form the extrusion as well as its initial temperature on being fed into the extrusion apparatus. In order to avoid the necessity of variations in downstream processing time and speed, it is preferable to provide a preheater microwave oven 86 including a conveyor 87 constructed in accordance with the present invention such as shown in FIG. 1 and provided with heat sensing means 88 at its output for detecting the exit temperature of material coming out of the preheater. The heat sensing means can be of any suitable source such as a pyrometer and is applied to a control circuit 90 which is sensitive to the temperature sensing means for varying the amount of microwave energy applied to the oven to thereby stabilize the exit temperature.

Means are provided for forming a microwave treatment oven 92 arranged to receive material from the preheater and for curing the same. The treatment oven is provided with first and second sections 94, 96, containing separate driven roller conveyors 96, 98 substantially the same as that shown in FIG. 1 and a drive means for driving each of the first and second driven roller conveyor sections at different speeds calculated to accept a change in the physical dimension and speed of movement of material passed through the treatment oven. As known, foamed rubber being cured expands both laterally in dimension and in length so that the input stream through the point of expansion travels at a lower rate of speed than the exit stream. The means for driving the first and second roller conveyor sections at different speeds may take any of various forms. In a typical installation it is preferred to gang each section together with a link chain and to drive them through independently controllable variable speed motors 96a, 98a so that the speed of operation of the stream can be precisely controlled. In certain applications, it may be possible to provide sprockets with a smaller number of teeth on the second section with both sections being ganged together on a common drive. In this way the second section speed will be higher than that of the first section.

Means are provided for establishing the existence and location of the point of curing of the material in the case of foamed rubber tubing. Such means consists of a first sensing system for detecting the existence of processed material prior to significant physical change in the material at a predetermined location in the first section of the oven and can comprise aligned upper and lower photoelectric cells 100, 102 and lights positioned across the path of the tubing such that the unexpanded tubing does not interrupt the light path to the photoelectric cells. A second sensing system is positioned subsequently across the path of the stream and is used to detect the existence of the physical and dimensional change in the treated material in that location. Such means comprise a second set of photocells and lights 104, 106 positioned across the path of the processed material such that the second sensing means is blocked by the expanded material but is not blocked by material prior to its expansion. Thus, movement of the location 108 of the dimensional change of the treated material toward the input end of the treatment oven is sensed by blocking the first sensing means, while movement of the location of dimensional change of the processed material toward the outlet is sensed by an unblocking of the second sensing means. The output of the first and second sensing means is applied to a control circuit 108 which varies the amount of power supplied to that section of the treatment oven such that movement of the location of curing toward the input decreases the amount of power while movement toward the output and actuating the second signal means increases the amount of power. In this way the duration of treatment time and the location of expansion of the material is stabilized within the treatment oven. In addition, the point of location is stabilized with respect to each of the driven roller conveyors which operate at differing speeds to accommodate the speed change of material passing through.

Many applications and modifications of the driven roller conveyor system of the present application will occur to those skilled in the art to which the invention pertains. In certain applications it may be of advantage to drive each roller of the conveyor by independent means and such a capability is provided by the present invention. In applications as for example the curing and expansion of foamed rubbers the present invention provides unique advantages in that the speed of the process line can be stabilized to a fixed value and controlled by a feedback sensing circuit to stabilize the thermal and curing treatment temperatures and transit temperatures of the material being processed. Because of the inherent rapid variability of microwave fields virtually no thermal lag is experienced in the system as set forth herein. The present invention may be used with a variety of materials and is not limited to the curing of expanded foam rubber materials. For example, it is contemplated that many other heat treatment processes can utilize apparatus as set forth herein as, for example, in the curing and cooking of sausages or of insulation boards or other discreet pieces of material desired to be heated. In certain cases it would be desirable to advance the exit speed of materials being processed to which the treatment oven as set forth in the description of FIG. 6 is immediately applicable. Accordingly, the scope of the present invention is not to be taken as limited by the specific disclosure set forth herein, except as limited by the accompanying claims.

I claim:

1. A microwave oven and conveyor apparatus comprising means forming a microwave oven and including end walls having openings therein for admitting movement of material through said oven, conveyor means for supporting moving material through said oven comprising a plurality of conductive metal rollers, a plurality of metal shaft means for non-rotatably mounting said rollers in a linear array in which the rollers are in spaced apart relation to each other and aligned for supporting material being conveyed thereon, means forming passages through one wall of said oven for permitting one end of each of said shafts to extend through said wall, the other ends of said shafts terminating within said oven, driven means mounted on the ends of said shafts exterior to said oven, drive means for engaging said driven means to drive said shafts and rollers, means forming a microwave oven, conveyor means for supporting moving material through said oven comprising a plurality of conductive metal rollers, a plurality of metal shaft means for mounting said rollers, said metal shafts and rollers together forming a solid metallic conformation without openings therein, a pair of guide rails mounted in spaced apart relation on opposite sides and adjacent the walls of the interior of said oven, bearing blocks supported on said guide rails for rotatably carrying said shafts so that said rollers are aligned in a linear array and are spaced apart in relation to each other, one of the ends of said support rods terminating at one of said bearing blocks, the other of said ends passing through said bearing blocks, means forming passages through the wall of said oven adjacent said last named bearing block for permitting said ends of said shafts to extend through said wall, driven means mounted on the ends of said shafts exterior to said oven, drive means for engaging said driven means to drive said shafts and rollers, means mounted on said shafts interiorly of said oven and adjacent each of said passages for forming a microwave capacitive shunt between the shaft and the immediately adjacent portion of the wall of the inside of said oven to minimize leakage of microwave energy therefrom, said shunt comprising a disc non-rotatably mounted on said shaft and constructed and arranged to extend radially away from and surrounding said shaft and to present a conductive surface having a closely spaced relationship to a portion of the adjacent wall of the oven.

2. Apparatus as in claim 1 in which said microwave shunt further includes a conductive means forming a disc projection on said wall, said wall disc projection having an area comparable to the disc secured to said shaft.

3. Apparatus as in claim 1 in which said microwave oven and conveyor apparatus includes a microwave source for supplying power to said oven and further in which heat sensing means is positioned at the output of said oven for detecting the exit temperature of material thereat, a control circuit sensitive to said temperature sensitive means for varying the amount of microwave energy delivered to the oven from said source to thereby stabilize the exit temperature of material being processed therethrough.

4. Apparatus as in claim 1, further including an antifriction shim interposed between said first and second conductive means.

5. Apparatus as in claim 1, further including a means forming an axial and thrust load absorbing bearing mounted on the outside of said oven wall to support said shaft means.

6. Apparatus as in claim 1, in which said drive means includes continuous chain link, motor means for engaging said chain link to drive the same, said chain link being connected to each of said sprockets in turn to drive the same at at least one predetermined speed.

7. Apparatus as in claim 1 in which said means for driving said shaft means includes means for driving certain of said shafts at a first predetermined and the remainder of said shafts at a speed different from said first shafts.

8. Apparatus as in claim 1 wherein the outer periphery of each roller is contoured to the shape of the material being conveyed.

9. Apparatus as in claim 7 wherein the outer periphery of each roller is provided with an antistick coating.

10. Apparatus as in claim 1, further including input and output conveyor means for supporting and moving material into and out from said oven, comprising at least one input metal roller and one output metal roller, metal shaft means for supporting each of said rollers in alignment with said conveyor rollers within said oven, sprocket means attached to said shaft means, means connecting said sprocket means to said drive means.

11. A microwave oven and conveyor apparatus comprising means forming a microwave oven and including end walls having openings therein for admitting movement of material through said capacitive shunt connected to each of said shafts and adjacent the wall inside of said oven to minimize leakage of microwave energy from said oven, said capacitive shunt including at least a conductive means forming a disc extending radially away from said shaft and generally in spaced parallel relation to said wall of said oven and secured to said shaft for rotation therewith, said shaft and the proximate portion of said oven wall being constructed and arranged to provide a closely spaced gap extending radially away from and surrounding said shaft.

12. Apparatus as in claim 3 in which said bearing blocks are adapted to support said shafts for rotational movement, and further including an axial thrust bearing mounted exteriorly of said oven and connected to said support shaft thereat.

* * * * *